United States Patent
Tomlinson et al.

(10) Patent No.: US 6,805,483 B2
(45) Date of Patent: Oct. 19, 2004

(54) SYSTEM FOR DETERMINING GAS TURBINE FIRING AND COMBUSTION REFERENCE TEMPERATURE HAVING CORRECTION FOR WATER CONTENT IN COMBUSTION AIR

(75) Inventors: Leroy O. Tomlinson, Niskayuna, NY (US); Robert S. Garry, Delmar, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/720,513

(22) Filed: Nov. 25, 2003

(65) Prior Publication Data

US 2004/0076218 A1 Apr. 22, 2004

Related U.S. Application Data

(62) Division of application No. 09/779,227, filed on Feb. 8, 2001.

(51) Int. Cl.$^7$ .......................... G01F 17/00; G01K 1/00; F02C 6/00; F01B 25/02
(52) U.S. Cl. ...................... 374/144; 374/142; 374/147; 60/803; 415/118; 416/61; 702/130
(58) Field of Search ................ 374/144, 141, 374/142, 147; 60/803, 772; 415/118, 47; 416/61, 62, 39

(56) References Cited

U.S. PATENT DOCUMENTS

| 5,054,279 | A | | 10/1991 | Hines | |
|---|---|---|---|---|---|
| 5,463,873 | A | * | 11/1995 | Early et al. | 62/121 |
| 5,471,831 | A | | 12/1995 | Rowe | |
| 5,930,990 | A | | 8/1999 | Zachary et al. | |
| 6,147,492 | A | | 11/2000 | Zhang et al. | |
| 6,250,064 | B1 | * | 6/2001 | Tomlinson et al. | 60/775 |
| 6,260,350 | B1 | * | 7/2001 | Horii et al. | 60/39.3 |
| 6,478,289 | B1 | * | 11/2002 | Trewin | 261/27 |
| 6,516,603 | B1 | * | 2/2003 | Urbach et al. | 60/39.3 |
| 6,530,210 | B2 | * | 3/2003 | Horii et al. | 60/39.53 |
| 6,711,888 | B2 | * | 3/2004 | Horii et al. | 60/39.3 |
| 6,715,295 | B2 | * | 4/2004 | Gadde et al. | 60/775 |
| 2004/0093850 | A1 | * | 5/2004 | Horii et al. | 60/39.3 |
| 2004/0112037 | A1 | * | 6/2004 | Yagi et al. | 60/39.3 |

* cited by examiner

Primary Examiner—Gail Verbitsky
(74) Attorney, Agent, or Firm—Nixon & Vanderhye P.C.

(57) ABSTRACT

A system is disclosed for adjusting a gas turbine firing temperature control algorithm and combustion reference temperature algorithms based on exhaust gas temperature, turbine pressure ratio and compressor discharge temperature for water content in the air entering the compressor differing from the design water content of ambient air. The water content in the ambient air is calculated by the control system from measured data from a dry bulb temperature sensor and a wet bulb temperature or humidity sensor.

6 Claims, 4 Drawing Sheets

SYSTEM FOR DETERMINING GAS TURBINE FIRING AND COMBUSTION REFERENCE TEMPERATURE HAVING CORRECTION FOR WATER CONTENT IN COMBUSTION AIR

CROSS RELATED APPLICATION

This application is a divisional of application Ser. No. 09/779,227, filed Feb. 8, 2001, the entire content of which is hereby incorporated by reference in this application.

FIELD OF THE INVENTION

The present invention relates to the field of gas turbine control systems and, in particular, for determination of and controlling the gas temperature at the discharge of the combustion system.

BACKGROUND OF THE INVENTION

Gas turbines operate at high temperatures, especially where the combustion system discharges into the inlet of a turbine. Satisfactory instrumentation has not been developed to reliably measure the gas temperature in the combustor discharge duct or turbine inlet section. However, the temperatures at the combustor discharge and turbine inlet are determined for purposes of controlling the gas turbine and sequencing of the combustion systems through a plurality of combustion modes. These temperatures are indirectly determined by the gas turbine control systems based on turbine parameters, e.g., exhaust gas temperature, compressor discharge temperature and pressure, and other well-known gas turbine parameters, that can be measured reliably.

Two key gas temperatures that can be reliably determined are the firing temperature and combustion reference temperature. These temperatures are used for controlling firing temperature and sequencing modes of the gas turbine combustion section.

Accurate control of the firing temperature, which is the gas temperature at the exit first stage nozzle of the turbine section, is needed because:

1. The firing temperature is a parameter that is traditionally used to limit the power output of gas turbines in industrial or electric utility service. Achievement of the rated or guaranteed output power generally requires that the gas turbine operate at its rated firing temperature.
2. The life of the turbine nozzles and buckets are a function of their operating temperature. Their life will be reduced if the firing temperature exceeds the rated temperature.
3. The emission performance of a gas turbine combustion system operating with premixed fuel and air is sensitive to its operating temperature. If combustion temperature exceeds the rated combustion temperature, then oxides of nitrogen (NOx) emissions will increase. If the actual temperature is lower than the rated temperatures, the carbon monoxide (CO) emissions will increase.

The combustion reference temperature is related to the gas temperature at the discharge of the combustor. The combustion reference temperature is significant to the control of a gas turbine operating at part load while transitioning from part load to full load, or unloading. The combustion reference temperature is employed for optimum sequencing of the combustion system and, thus, reliable operation and effective control of NOx and CO emissions in the turbine exhaust gas. Thus, accurate determination of the combustion reference temperature is needed for combustion sequencing.

For gas turbine control purposes, gas turbine firing temperature and combustion reference temperature have been conventionally determined using algorithms based on turbine exhaust gas temperature, turbine pressure ratio, and, in some cases, compressor discharge temperature. The input data for these algorithms include: measured turbine exhaust gas temperature; compressor discharge pressure, which simulates turbine inlet pressure; atmospheric pressure, which simulates turbine exhaust pressure; and compressor discharge temperature.

A conventional firing temperature algorithm is the sum of the turbine exhaust gas temperature and the temperature drop through the turbine. The exhaust gas temperature can be measured directly. The turbine temperature drop is a function of the turbine working fluid composition, pressure ratio of the turbine, turbine efficiency, and dilution by the air entering the gas stream from the air cooled nozzles, buckets, wheels and shrouds. Combustion reference temperature is determined by an algorithm that includes a similar algorithm as used to determine turbine temperature drop, and may include other algorithm elements having parameters related to determination of gas temperature at the discharge of the combustor. Since the turbine efficiency and cooling air dilution varies with operating conditions, the algorithms for firing temperature and combustion reference temperature are usually derived from a series of cycle design calculations that are specific to each gas turbine model and tailored to conditions throughout the normal operating range of the gas turbine model. The algorithms are a function of exhaust gas temperature and turbine pressure ratio with a bias for compressor discharge temperature, which is linearized as much as practical for stable control operation.

The water content in the gas passing through a turbine is presumed to be at a design water content level in the algorithms used to determine the combustion reference temperature and firing temperature. The majority of the gaseous components in the turbine working fluid are carbon dioxide and water formed from the combustion of hydrocarbon fuel, air that was not used for combustion (excess air), and water vapor that was included in the combustion air. The varying water content in the turbine working fluid results from the varying water content in the combustion air. The effect of off-design water content in the working fluid passing through the turbine has not been considered in current control systems with respect to its effect on the calculation of gas temperature drop through the turbine for control purposes. Rather, the conventional algorithms incorporate an assumption that the water content of the working fluid is at the design (or intended) level of water in the working fluid. These conventional algorithms do not take off design levels of water content. The water content of the working fluid affects the gas temperature drop through the turbine. This is explained by the effect of the water content on the average thermodynamic characteristics of turbine working fluid. The thermodynamic characteristic affecting this process is the ratio of specific heats (specific heat at constant pressure divided by the specific heat at constant volume), which relates the temperature ratio of a thermodynamic process to its pressure ratio as follows:

$$T1/T2 = (P1/P2) \exp K$$

Where:
 T1=Inlet Temperature (degrees R)
 T2=Discharge temperature (degrees R)
 P1=Inlet pressure (psia)
 P2=Discharge pressure (psia)

K=Ratio of specific heats

The isentropic exponent is for water vapor 1.3, and is 1.4 for air and other components of the turbine working fluid. The reduced isentropic exponent for water vapor reduces the temperature drop when expanded over a pressure ratio as compared to air and carbon dioxide. This factor has a significant effect on the firing temperature and combustion temperature calculation when the gas turbine operates with a working fluid water content differing from the design water level. Since the major fraction of the working fluid is combustion air, which is ambient air or humidified ambient air, an off-design water content occurs when the ambient air humidity differs substantially from the design basis for the control algorithm, and when water is artificially injected into the combustion air by an evaporative cooler or by a supersaturation system (wet compression) for gas turbine power augmentation.

Gas turbine firing temperature controls and combustion sequencing as a function of combustion reference temperature currently do not include features to respond to the variation in water vapor in the gas flowing through the turbine section, which results in an erroneous calculation of the gas temperature drop through the turbine. If the actual water vapor content in the combustion air is substantially higher than the design water content, the control system will erroneously limit the firing temperature to a temperature lower than the rated firing temperature and sequence the combustion system at combustion reference temperature lower than an optimum reference temperature. If the actual water vapor content in the combustion air is substantially lower than the design vapor content, the control system will limit the firing temperature to a temperature higher than the rated temperature and sequence the combustion system at a combustion reference temperature higher than the intended reference temperature. Operating off the rated firing and combustion temperatures adversely affects the range of operation of the gas turbine and the exhaust emission levels.

The normal water content in ambient air has not caused a serious problem, since the variation in water vapor content in ambient air in temperate climates is only approximately 3%. This small variation in ambient moisture content will cause a total variation in turbine temperature drop calculation of approximately =/−12° F. Such a slight temperature variation from the rated turbine firing temperature and/or the combustion reference temperature tends not to adversely affect gas turbine operation or $NO_x$ or CO emissions. Accordingly, the algorithms used to determine the combustion reference temperature and firing temperature have not treated the water content as a variable. However, ambient air in tropical climates may have a large water content variation, and the injection of water into the air intake of a compressor can also cause the water content of the intake air to vary substantially from the design water content level(s).

Water injection systems can substantially increase the water content of compressor inlet air. Wet compression systems, such as described in U.S. Pat. Nos. 5,867,990 and 5,930,990 and European Patent EP 0 781 909 A2 provide gas turbine compressors with a supersaturated air/water inlet mixture. The firing temperature is reduced due to the high water content of the working fluid so that the power augmentation provided by the wet compression system is reduced. In addition, the turbine CO emissions are increased by the reduced firing temperature and the added water entering the combustion system with the air. If wet compression systems are employed during part load operation, the error in combustion reference temperature adversely affects the sequencing of the combustor.

BRIEF SUMMARY OF THE INVENTION

A method and system for adjusting turbine control algorithms has been developed to provide accurate calculation of the firing temperature and combustion reference temperature of a gas turbine as the water vapor content in the working fluid varies substantially from the design water content value. The method and systems improves the control and sequencing of gas turbines operating with wet compression systems, and in ambient environments where the water vapor content differs substantially from design levels.

Achievement of gas turbine rated power output, efficiency, emission performance, and life of turbine and combustion system components are all dependent on accurate control of firing temperature. Gas turbines equipped with combustion systems that operate in a plurality of combustion modes are sequenced based on a similar calculated temperature, commonly referred to as the combustion reference temperature. An accurate determination of combustion reference temperature is needed for optimum sequencing of the combustion system. Similarly, the firing temperature control for most industrial gas turbines is based on exhaust gas temperature and turbine pressure ratio.

When the water content in the turbine working fluid passing through the turbine differs substantially from the design content, the algorithms that determine the firing temperature and combustion reference temperature take into account the thermodynamic properties of the water vapor and air in the working fluid. The control system for the gas turbine uses these algorithms to determine accurate turbine firing and combustion reference temperatures. Thus, the water content in the working fluid can vary substantially from the design value from a variety of reasons including water vapor content in ambient air supplied to the compressor, water evaporated into the compressor inlet air by an evaporative cooler, or water injected into the air before entering the compressor to supersaturate the working fluid with water. Nevertheless, the algorithms enable the control system to account for the water vapor and determine accurate turbine firing and combustion reference temperatures.

An exemplary method of adjusting the algorithms is disclosed for determining gas turbine firing temperature control and combustion reference temperature based on the measured water content of the air entering the gas turbine compressor. The water content in the air entering the compressor is determined by the control system from the measured flow of the air plus water vapor, humidity of the ambient air, water evaporated by an air saturator (evaporative cooler), and water injected into the inlet air by a supersaturation system.

A system is disclosed for adjusting a gas turbine firing temperature control algorithm and combustion reference temperature algorithm (based on exhaust gas temperature, turbine pressure ratio and compressor discharge temperature) to account for the water content in the air entering the compressor, especially if the actual water content differs from the design water content (when the gas turbine intake air is ambient air). The water content in the ambient air is calculated by the control system based on inputs from a dry bulb temperature sensor, and a wet bulb temperature or humidity sensor.

Also disclosed is a system and control for adjusting the gas turbine firing temperature control algorithm and combustion reference temperature algorithms based on exhaust gas temperature, turbine pressure ratio, compressor discharge temperature and the water content in ambient air plus water evaporated by a media type evaporative cooler located in the air intake duct. The water fraction of the air/water mixture is calculated from data regarding the ambient air dry bulb temperature, ambient wet bulb temperature, and dry bulb temperature measured in the air intake duct downstream of the evaporative cooler for the gas turbine compressor.

Another embodiment is a system and control for determining a gas turbine firing temperature and a combustion reference temperature based on control algorithms that have input parameters including exhaust gas temperature, turbine pressure ratio, and compressor discharge temperature, and the water content of the air entering the gas turbine compressor, especially if the water content differs from the design content and the water content is that of the ambient air plus water injected by an atomized water spray type evaporative cooler located in the air intake duct. The water fraction of the air/water mixture downstream of the evaporative cooler is the water content in the ambient air determined from the ambient air dry bulb temperature and the wet bulb temperature, and also the amount of water injected in the evaporative cooler (as measured by a flow sensor in the water delivery pipe) divided by the air/water mixture flow to the gas turbine compressor (as measured by a flow sensor in the gas turbine air intake volute or other method of measuring gas turbine working fluid flow).

A further disclosed embodiment is a system and control for adjusting the gas turbine firing temperature control algorithm and combustion reference temperature algorithms based on exhaust gas temperature, turbine pressure ratio and compressor discharge temperature for water content in the air entering the gas turbine compressor. The water content includes the water content of ambient air and the amount of water injected into an atomized water spray type supersaturation grid located in the intake duct or gas turbine compressor intake volute. The water fraction of the air/water mixture downstream of the supersaturation grid is the water content in the ambient air calculated from the measured ambient air dry bulb temperature and the measured ambient air wet bulb temperature plus the water injected in the supersaturation grid measured by a flow sensor in the water delivery pipe divided by the air/water mixture flow to the gas turbine compressor measured by a flow sensor on the gas turbine air intake volute or other method of measuring gas turbine working fluid flow.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
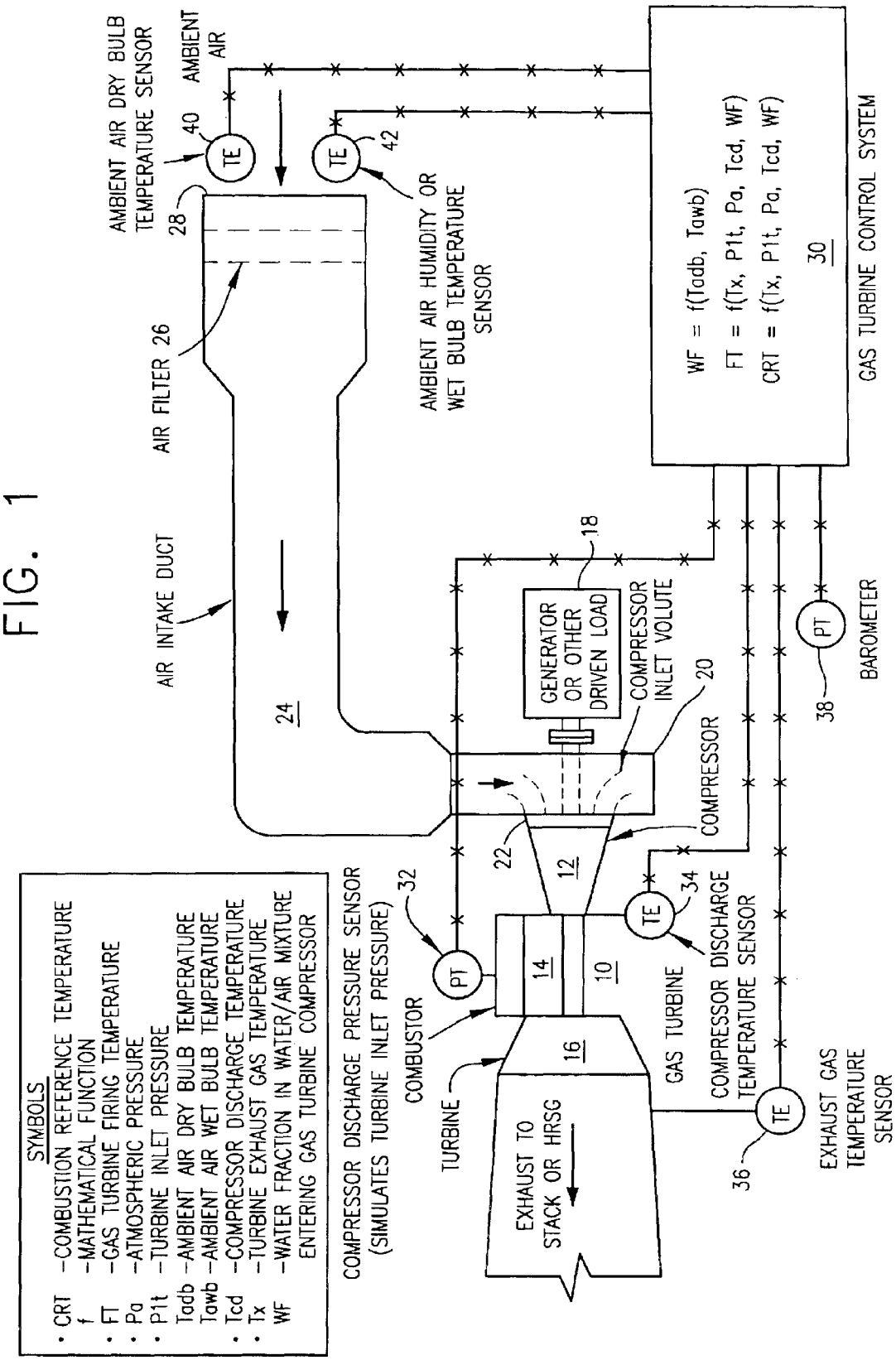
FIG. 1 is a schematic diagram of a first embodiment of a gas turbine system having a water injection system and associated control system.

FIG. 1 is a diagram of a first embodiment of a gas turbine air intake system having a supersaturation water injection system. The gas turbine 10 includes a compressor 12, combustion section 14, a turbine 16 and a turbine exhaust system. The working fluid of the gas turbine is the air/water mixture that enters the compressor, is mixed with fuel in the combustion section where it is converted to hot gases and then exits as turbine exhaust gases. The output of the gas turbine may be coupled to a generator 18 or other power load.

The air/water mixture enters the compressor from an air inlet hood 20 and initially passes through the inlet guide vanes (IGVs) 22 of the compressor. The mixture is progressively compressed as it passes through a series of compressor stages which generally include a cascade of stators and rotating compressor blades, and may include a centrifugal compressor stage. The entrance to the air inlet hood 20 is connected to the air intake duct 24, which includes an air filter 26 and an entrance air scoop 28. Ambient air enters the scoop, is filtered and is ducted to the hood 20, where the air enters the compressor.

A conventional gas turbine control system 30, such as a General Electric Mark V™ control system, governs the operation of the gas turbine 10. The control system receives input signals for a variety of sensors monitoring the condition and operation of the gas turbine, such as rotational speed sensors detecting the rotational speed of the gas turbine, air flow sensors (FS) detecting the pressures and working fluid pressures (static and total pressures) at the compressor inlet and compressor discharge (PT—pressure sensor) 32, temperature sensors in the compressor and turbine that measure the temperatures of the gas turbine working fluid at the compressor discharge (TE—temperature sensor) 34, turbine exhaust gas (TE—temperature sensor) 36 and other locations in the gas turbine.

Sensors also monitor ambient conditions such as barometric pressure with a barometric pressure sensor (PT) 38, and ambient temperature with a dry bulb temperature sensor (TE) 40 and a wet bulb temperature sensor (TE) 42. The sensor signals are transmitted to the controller 30 via conventional means, such as electrical wires, wireless links, and other communications paths.

Figure 2:
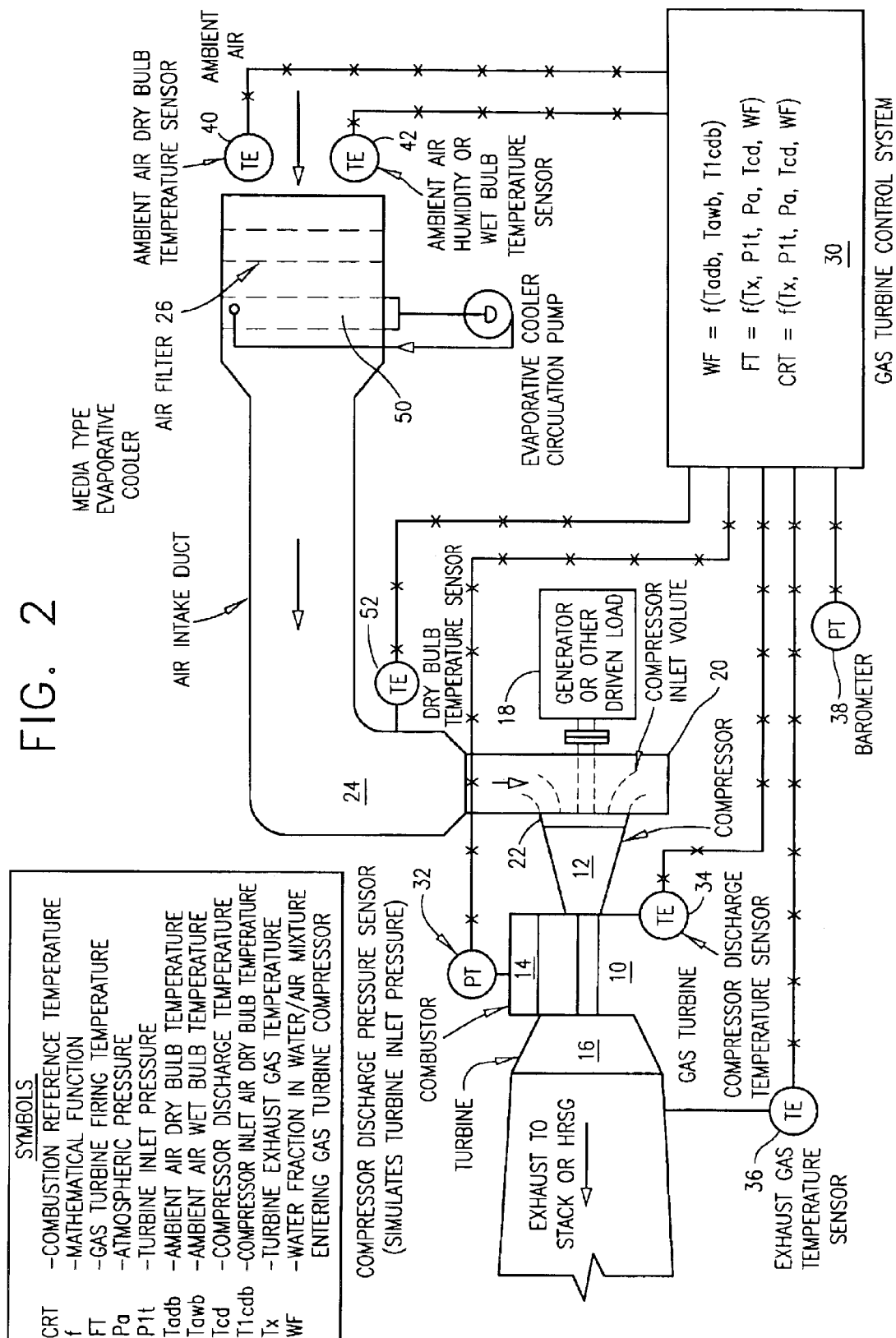
FIG. 2 is a schematic diagram of a second embodiment of a gas turbine system having a water injection system and associated control system.
Figure 3:
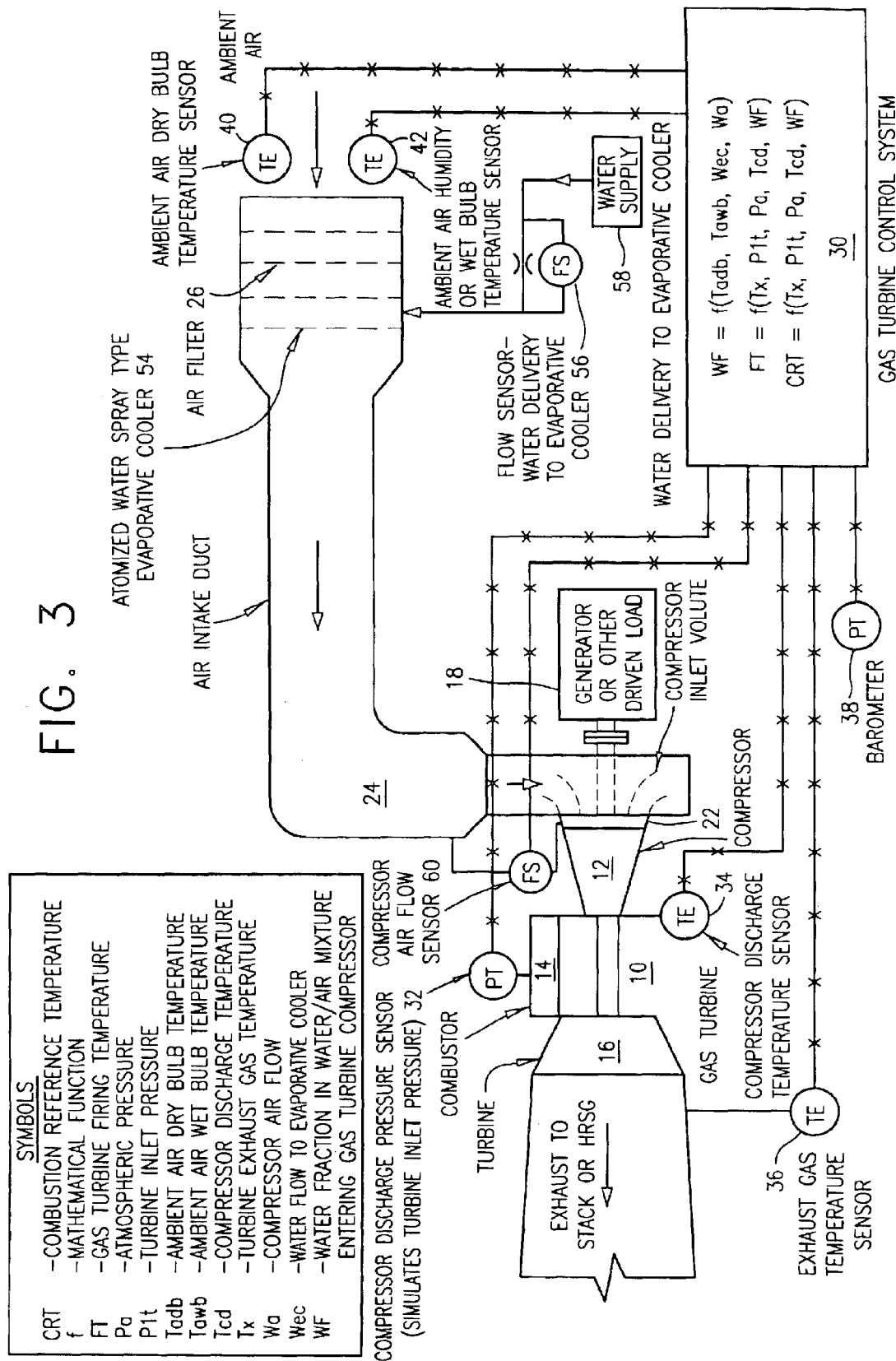
FIG. 3 is a schematic diagram of a third embodiment of a gas turbine system having a water injection system and associated control system.
Figure 4:
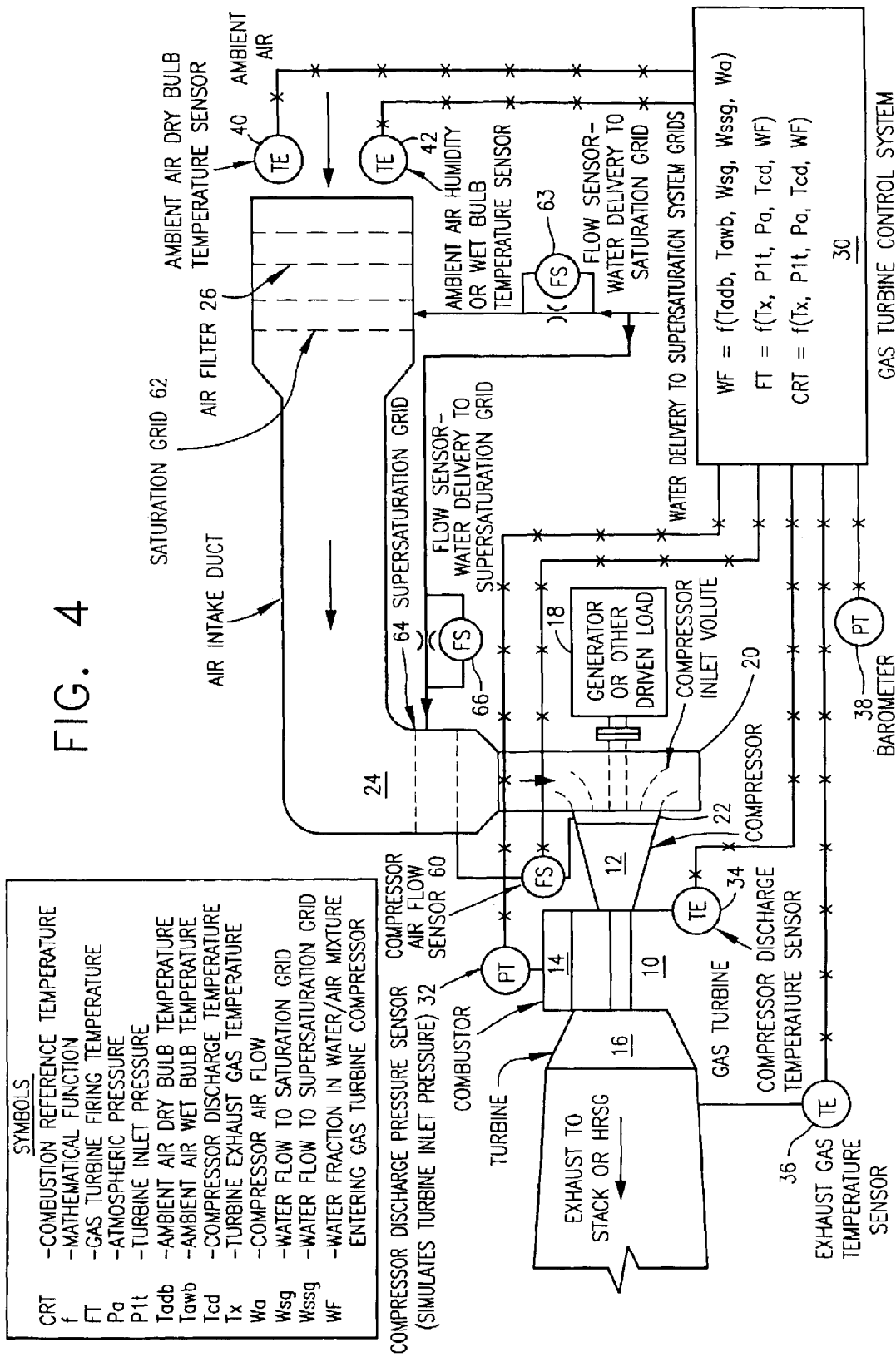
FIG. 4 is a schematic diagram of a fourth embodiment of a gas turbine system having a water injection system and associated control system.

The control system 30 may include a computer system receiving sensor inputs from the gas turbine, various pressure and temperature sensors, air and water flow sensors (see flow sensors in FIGS. 2, 3 and 4). A processor in the computer evaluates the sensor inputs and determines the combustion reference temperature and the firing temperature. The processor accesses a computer memory unit to retrieve stored data from the sensor measurements and gas turbine operating parameters, and retrieve the algorithm(s) which use this data to generate outputs useful in determining the combustion reference and gas turbine firing temperatures. The computer may issue a command signal to a fuel combustor 14 to adjust the fuel flow rate to the combustor so that the actual firing temperature matches a desired firing temperature. In addition, the control system applies the calculated combustion reference temperature to sequence the combustor operating modes as gas turbine power output is varied to achieve optimum combustor operation and low exhaust emissions. The control system is responsive to gas turbine operating parameters and ambient air conditions. The control system may be integrated with or into the computer system for the gas turbine control system. The system is applicable for controlling water spray type evaporative coolers (air saturation system), single water injection grid type supersaturation systems, two stage supersaturation systems and other water injection systems.

The control system 30 determines the combustion reference temperature and firing temperature based, in part, on the water content of the air entering the air duct 24, hood 20 and compressor inlet guide vanes. The control system determines these temperatures based on input signals from: the compressor discharge temperature (Tcd) (temperature sensor 34), the compressor discharge pressure or turbine inlet pressure (P1t) (pressure sensor 32), the exhaust gas temperature (Tx) (temperature sensor 36), and atmospheric pressure (Pa) (sensor 38). In addition, the controller determines the combustion reference temperature (CRT) and gas firing temperature (FT) base further on the water fraction (WF) of the working fluid (air/water mixture) entering the compressor. Exemplary equations for determining the combustion reference temperature (CRT) and gas firing temperature (FT) are:

$FT=f(T_x, P1t, Pa, Tcd, WF)$ $CRT=f(T_x, P1t, Pa, Tcd, WF)$ $WF=f(Tadb, Tawb)$ where Tadb is the ambient air dry bulb temperature, and Tawb is the ambient air wet bulb temperature.

In the embodiment shown in FIG. 1, the gas turbine firing temperature and combustion reference temperature algorithms (conventional algorithms) are adjusted for water vapor (WF) content in the ambient air. In this embodiment, the air intake duct 24 has no humidifying devices to increase the water content of the air supplied to the compressor inlet 20. The humidity (WF) of the ambient air is determined from the compressor intake air dry bulb temperature (Tadb) and wet bulb temperature (Tawb). Based on the ambient water faction (WF), the control system determines an adjustment to the firing temperature control and combustion reference temperature algorithms (as determined from conventional algorithms) based on the difference between the measured water vapor (WF) content and a design water vapor content in the air entering the compressor.

FIG. 2 illustrates a second embodiment in which the gas turbine firing temperature (FT) and combustion reference temperature (CRT) algorithms are adjusted for water vapor content in the ambient air plus water evaporated by a media evaporative cooler 50. The water fraction (WF) in the air at the discharge of the evaporative cooler is calculated by the control system 40 from the measured ambient air dry bulb temperature (Tadb) and the dry bulb temperature (T1cdb) in the duct 24 downstream of the evaporative cooler. The dry bulb temperature in the duct 24 is determined from a dry bulb temperature sensor 52 in the duct. The water fraction (WF) is a function of the ambient dry bulb temperature (Tadb), the ambient wet bulb temperature (Tawb) and the dry bulb temperature (T1cdb) in the duct. The firing temperature (FT) and combustion reference temperature (CRT) are determined using the equations for FT and CRT stated above. The control system calculates the adjustment to the firing temperature control and combustion reference temperature algorithms based on the difference between the measured water vapor content (WF) in the air entering the compressor and the design water vapor content in the air entering the compressor.

FIG. 3 illustrates a third embodiment in which the gas turbine firing temperature (FT) and combustion reference temperature (CRT) algorithms are adjusted for water vapor (WF) content in the ambient air plus water evaporated by an atomized water spray type evaporative cooler 54. The water fraction (WF) in the air at the discharge of the evaporative cooler 54 is determined by the control system 30 from measured ambient air dry bulb temperature (Tadb), ambient air wet bulb temperature (Tawb), the water flow (Wec) to the spray type evaporative cooler, and the air/water mixture air flow (Wa) into the compressor. The amount or rate of water injected by the cooler 54 is determined by a water flow sensor 56 that measures water flow to the cooler from a water supply 58. The air/water mixture flow to the compressor is measured by an air flow sensor 60 positioned near the IGV/compressor inlet.

The water fraction downstream of the evaporative cooler is the sum of the water fraction in the ambient air that is calculated from the dry bulb and wet bulb temperature plus the amount or rate of water injected (Wec) in the evaporative cooler divided by the air/water mixture flow (Wa). The control system calculates the adjustment to the firing temperature control and combustion reference temperature algorithms based on the difference between the measured water vapor (WF) content and the design water vapor content in the air entering the compressor.

FIG. 4 illustrates a fourth embodiment in which the gas turbine firing temperature and combustion reference temperature algorithms are adjusted for water vapor content in the ambient air, plus the water injected in an atomized water spray type system that supersaturates with water the air supplied to a gas turbine compressor. This water injection system includes a grid 62 of atomizing nozzles and manifolds to inject water to saturate the air flow through the intake air duct 24. A water flow sensor 63 determines the rate of water flowing to the saturation grid 62. The injection system further includes a supersaturation grid 64 of nozzles and manifolds for injecting a water mist (at supersaturated levels) into the saturated air/water mixture flowing through the duct 24. A water flow sensor 66 determines the rate of water flowing to the supersaturation grid 64. The measured data for calculation of the water fraction in the air at the discharge of the spray type supersaturation system includes the ambient air dry bulb temperature (Tadb) and wet bulb temperature Tawb), the water flow (Wsg) to the saturation grid, the water flow (Wssg) to the supersaturation grid, and the air/water mixture flow. The water fraction downstream of the supersaturation system is the sum of the water fraction in the ambient air that is calculated from the dry bulb and wet bulb temperature plus the water (Wssg+Wsg) injected in the supersaturation system divided by the air/water mixture flow. The control system calculates the adjustment to the firing temperature control and combustion temperature algorithms based on the difference between the measured water content and the design water content in the air entering the compressor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A control system for determining a combustion temperature of a gas turbine having a compressor, combustion section, a water injector in an inlet upstream of the compressor, and a turbine, said system comprising:

at least one water content sensor in the inlet upstream of the compressor and downstream of the water injector, wherein said sensor is generating data indicative of a variable water content of air entering the compressor, a processor executing an algorithm for determining the combustion temperature based in part on the data indicative of the water content, and data and program memory storing the data indicative of the water content and the algorithm for execution by the processor wherein said processor generates an output indicative of the determined combustion temperature to control the combustion section.

2. A control system as in claim 1 wherein the control of the combustion section comprises a combustion fuel rate valve responsive to the output.

3. A control system as in claim 1 wherein the at least one water content sensor comprises a dry bulb temperature sensor and a wet bulb temperature sensor.

4. A control system as in claim 1 wherein the gas turbine further includes a water injection system and said control system further comprises a first dry bulb temperature sensor upstream of the water injection system and a second dry bulb temperature sensor downstream of the water injection system.

5. A control system as in claim 4 further comprising a web bulb temperature sensor upstream of the water injection system.

6. A control system as in claim 1 wherein the gas turbine further includes a supersaturating grid of water atomizing nozzles, and said system comprises a web bulb temperature sensor and dry bulb temperature sensor upstream of the grid, and a water flow sensor generating data indicative of a rate of water atomized by the nozzles.

* * * * *